United States Patent [19]

Melville

[11] Patent Number: 4,817,245

[45] Date of Patent: Apr. 4, 1989

[54] MEAT SAW AND METHOD OF PROCESSING MEAT

[76] Inventor: Richard A. Melville, 8c Tagalad Road, Mission Bay, Auckland, New Zealand

[21] Appl. No.: 892,760

[22] Filed: Jul. 31, 1986

[30] Foreign Application Priority Data

Aug. 5, 1985 [NZ] New Zealand .......................... 212990

[51] Int. Cl.$^4$ .............................................. A22B 17/02
[52] U.S. Cl. .......................................... 17/52; 83/490; 83/477.2; 83/861; 83/884
[58] Field of Search .................... 83/490, 883, 477.2, 83/884, 861; 17/52

[56] References Cited

U.S. PATENT DOCUMENTS

| | | | |
|---|---|---|---|
| 886,055 | 4/1908 | Hillback | 83/490 X |
| 1,259,213 | 3/1918 | Crawford | 83/490 X |
| 1,478,052 | 12/1923 | Oliver | 83/490 |
| 2,389,934 | 11/1945 | Rothenberg et al. | 83/490 X |
| 4,128,916 | 12/1978 | Fick et al. | 17/52 |

*Primary Examiner*—Donald R. Schran
*Attorney, Agent, or Firm*—Ladas & Parry

[57] ABSTRACT

The present invention provides a meat saw for simultaneously making multiple cuts in a piece of meat and a process for cutting a piece of meat. The meat saw includes a base and a saw table supported by the base. The saw table is adapted to support the piece of meat to be sawn and contains a plurality of elongated, generally parallel apertures. A restraining member holds the piece of meat against the saw table. The meat saw further includes a plurality of spaced rotary saw blades mounted on a common rotatable shaft, the shaft being located beneath the saw table. The shaft is movably mounted on the base so that the position of the shaft relative to the saw table is continuously adjustable. The position of the shaft can be adjusted from a lower position, in which the blades do not extend above the saw table, to an upper position in which the blades extend through the apertures in the saw table and above the saw table. The blades engage and cut the piece of meat when the shaft is raised towards the upward position.

27 Claims, 5 Drawing Sheets

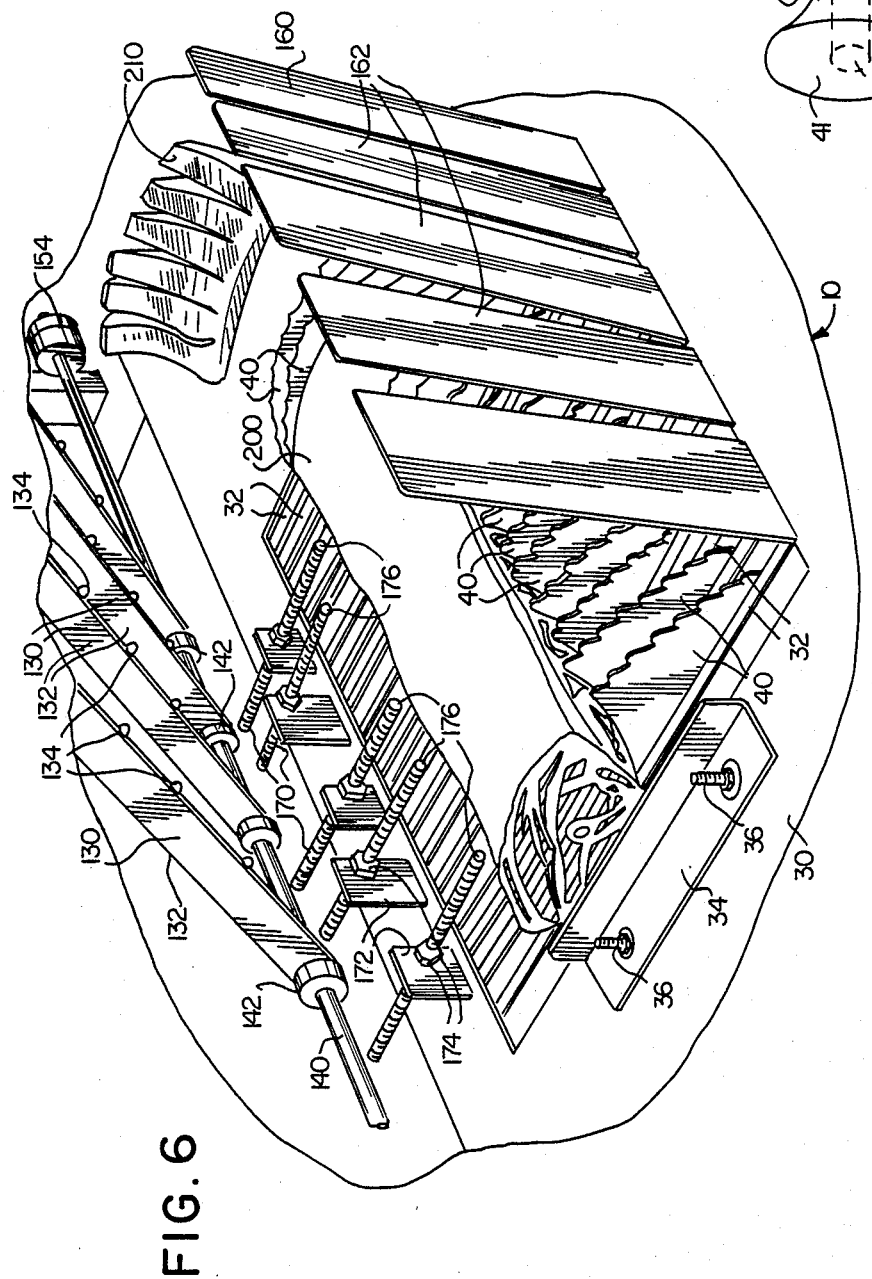
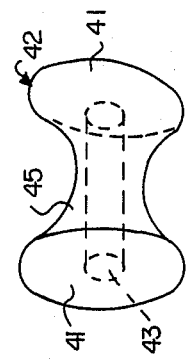

MEAT SAW AND METHOD OF PROCESSING MEAT

BACKGROUND OF THE INVENTION

The present invention relates generally to meat processing apparatus and methods and in particular to an apparatus and method for simplifying the processing of pre-cut meat portions.

The processing of an animal carcass involves numerous stages in the reduction of the carcass to individual servings. In many instances, one or more of the final preparation stages are left to the purchaser to tend to in the home or restaurant. Alternatively, final cutting may take place at the retail sales level. On the other hand, it is sometimes desirable to carry out the full processing of the meat carcass or other bulk meat at the packing house or wholesale sales level of distribution.

Full processing of an animal carcass involves substantial labor costs. For example, the carcass may be cut into individual servings which generally requires the close attention of a skilled butcher. Further, once cut, the individual servings must be either individually packaged or recollected for packaging into multiple serving units. Packaging is conventionally accomplished by vacuum sealing the meat within packages having at least one transparent surface. In order to present an attractive display which will enhance consumer interest and increase sales, it is desirable to reassemble multiple serving portions in their original positions and orientation. This process is also labor intensive.

There is a need for processes and apparatus which reduce the labor costs associated with the butchering and packaging of meat for retail sale. In particular, there is a need for processes and apparatus which simplify and expedite the packaging of multiportion servings of meat products on the packing plant level distribution. The apparatus and process of the present invention meet these needs.

SUMMARY OF THE INVENTION

In one aspect, the present invention provides a meat saw for simultaneously making multiple cuts in a piece of meat. The meat saw includes a base and a saw table supported by the base. The saw table is adapted to support the piece of meat to be sawn and contains a plurality of elongated, generally parallel apertures. Means are provided for holding the piece of meat against the saw table.

The meat saw further includes a plurality of spaced rotary saw blades mounted on a common rotatable shaft, the shaft being located beneath the saw table. The shaft is movably mounted on the base so that the position of the shaft relative to the saw table is continuously adjustable. The position of the shaft can be adjusted between a lower position, in which the blades do not extend above the saw table, and an upper position in which the blades extend through the apertures in the saw table and above the saw table. The blades engage and cut the meat when the shaft is raised towards the upward position. Means are also provided for rotatably driving the shaft and for adjusting the position of the shaft relative to the saw table.

Another aspect of the plesent invention provides a rocess for cutting a piece of meat containing bone and sue. The process can employ the meat saw of the sent invention or other suitable apparatus. The pro- comprises placing the piece of meat adjacent a plurality of generally parallel spaced saw blades. The saw blades and the piece of meat are moved relative to each other to cut into, but not completely through, the piece of meat with the saw blades. The cut of the saw blades is terminated at a point where the bone has been at least substantially cut through, but sufficient tissue remains uncut so that the piece of meat is held together by the uncut tissue as an integral piece. The saw blades are then withdrawn from the piece of meat, and the piece of meat can be processed further or stored. Preferably, the piece of meat is cut while frozen and the bone in the piece of meat is cut completely through.

BRIEF DESCRIPTION OF THE DRAWINGS

The foregoing summary, as well as the following detailed description of the presently preferred embodiment of the invention, will be better understood when read in conjunction with the appended drawings, it being understood, however, that this invention is not limited to the precise arrangements illustrated. In the drawings:

FIG. 6 is an enlarged and broken perspective view of a portion of the meat saw of FIG. 1; and FIG. 7 is an enlarged perspective view of a spacer used to separate the saw blades of the meat saw of FIG. 1.

DETAILED DESCRIPTION OF THE PREFERRED EMBODIMENT

Figure 1:
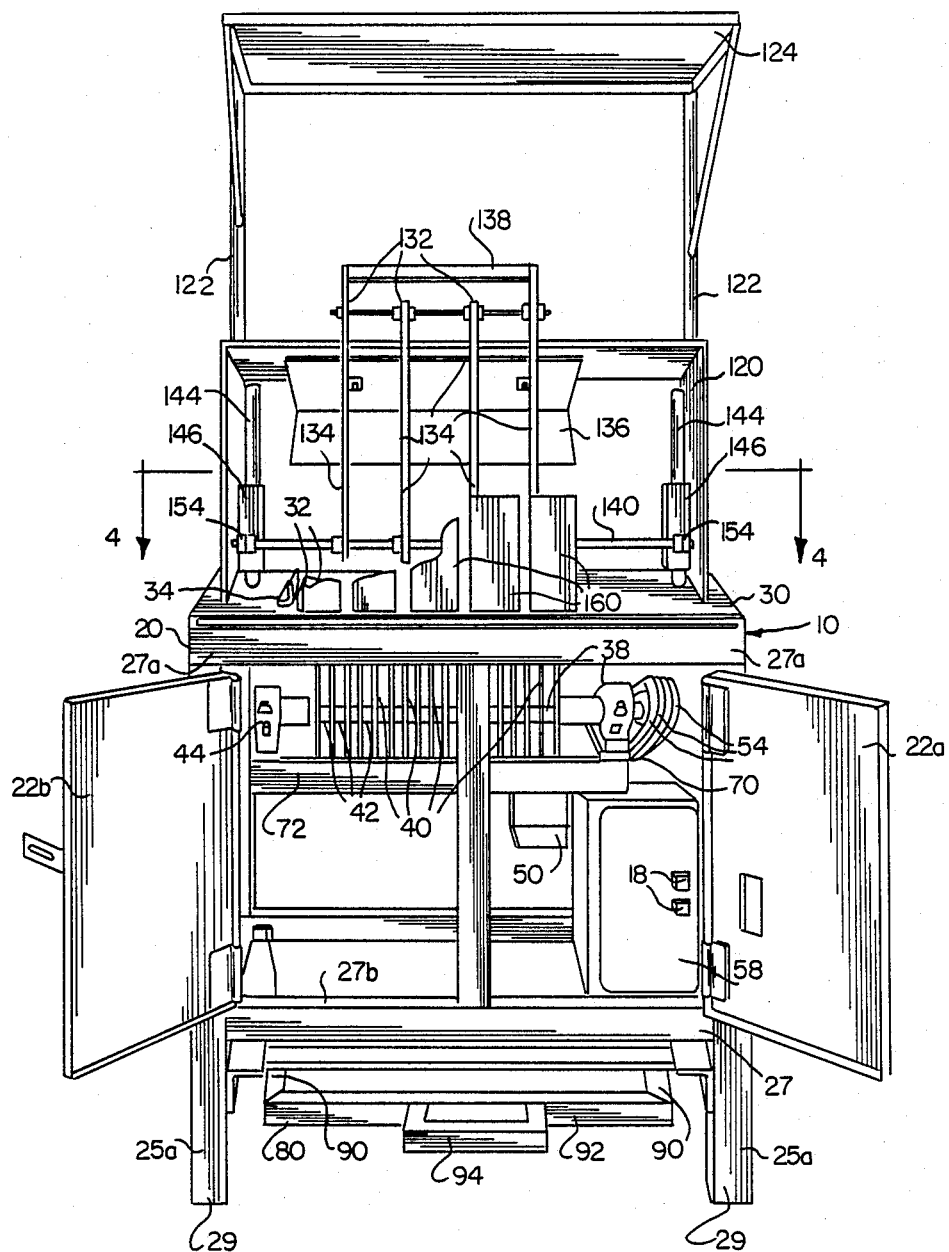
FIG. 1 is a partially broken, front elevational view of a meat saw in accordance with a preferred embodiment of the present invention.
Figure 2:
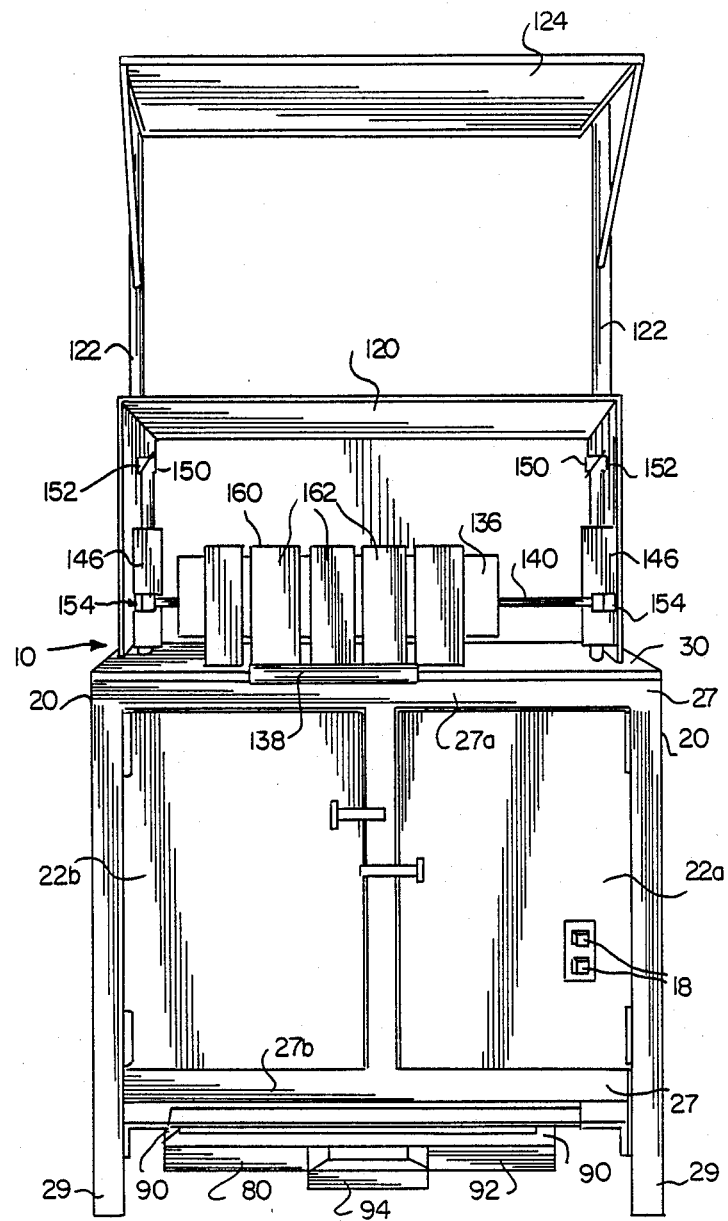
FIG. 2 is a front elevational view of the meat saw of FIG. 1 with the doors closed.

Referring the drawings wherein ike to 1 numerals indicate like elements throughout the several views and particularly to FIGS. 1, 2 and 6, it can be seen that the present invention in one presently preferred embodiment provides a meat saw 10 including a base member or base 20, a saw table 30 supported by the base 20 and having a plurality of elongated, generally parallel apertures 32, and a plurality of spaced rotary saw blades 40 mounted on a common rotatable shaft 38. Ihe meat saw 10 further includes means for holding a piece of meat 200 against the saw table 30. As best seen in FIGS. 1 and 6, the holding means comprises a restraining member 130 in the present embodiment.

The shaft 38 is located beneath the caw table 30. As discussed in detail below, the shaft 38 is movably mounted on the base 20 so that the position of the shaft 38 relative to the saw table 30, is continuously adjustable from a lower position in which the blades 40 do not extend above the saw table 30 (shown in FIG. 1) to an upper position in which the blades extend through the apertures 32 in the saw table 30 (shown in FIG. 6). The blades 40 engage and cut the meat 200 as the shaft 38 is raised toward the upper position. As discussed below, the meat saw 10 also includes means for rotatably driving the shaft 38 and means for adjusting the position of the shaft 38 relative to the saw table 30.

Preferably, unless otherwise indicated below, the meat saw 10 is fabricated from parts formed from high strength, rust and stain resistant, easily cleanable materials such as stainless steel. Non-structural parts can be fabricated from other easily cleanable materials such as steel alloys, aluminum, plastic or the like.

The rotary saw blades 40 are securely mounted on the shaft 38 so that the blades 40 rotate with the shaft 38 in a manner well known in the art for example, by nuts and lock washers (not illustrated). The blades 40 are spaced a predetermined distance from each other by spacer members 42 which, in the present embodiment, have a generally hour glass-shaped exterior surface 45 (FIG. 7). Each spacer member 42 has an axially extending aperture 43 adapted to receive and surround the shaft 38 and a pair of generally flat ends 41 adapted to engage the adjacent blades 40. Each spacer member 42 has a generally hour glass-shaped surface 45 extending between the ends thereof. The intersection of the hour glass-shaped surface 45 with a plane extending through the axis of the spacer member 42 defines a generally concave curve. The general hour glass shape of the spacer members 42 facilitates cleaning of the space between the blades 40 separated by the spacer member 42 without removal of the blades 40 from the shaft 38.

The saw blades 40 are stainless steel blades of the type generally employed in butchering meat. The blades 40 are mounted on the shaft 38 so that the cutting edges of the teeth of the blades 40 rotate from the front to the rear of the saw table 30 as the blades 40 rotate on the shaft 38, as best seen in 1.IG. 6. As used herein, "front" denotes the direction of or proximate to the position of the operator of the meat saw 10.

Figure 3:
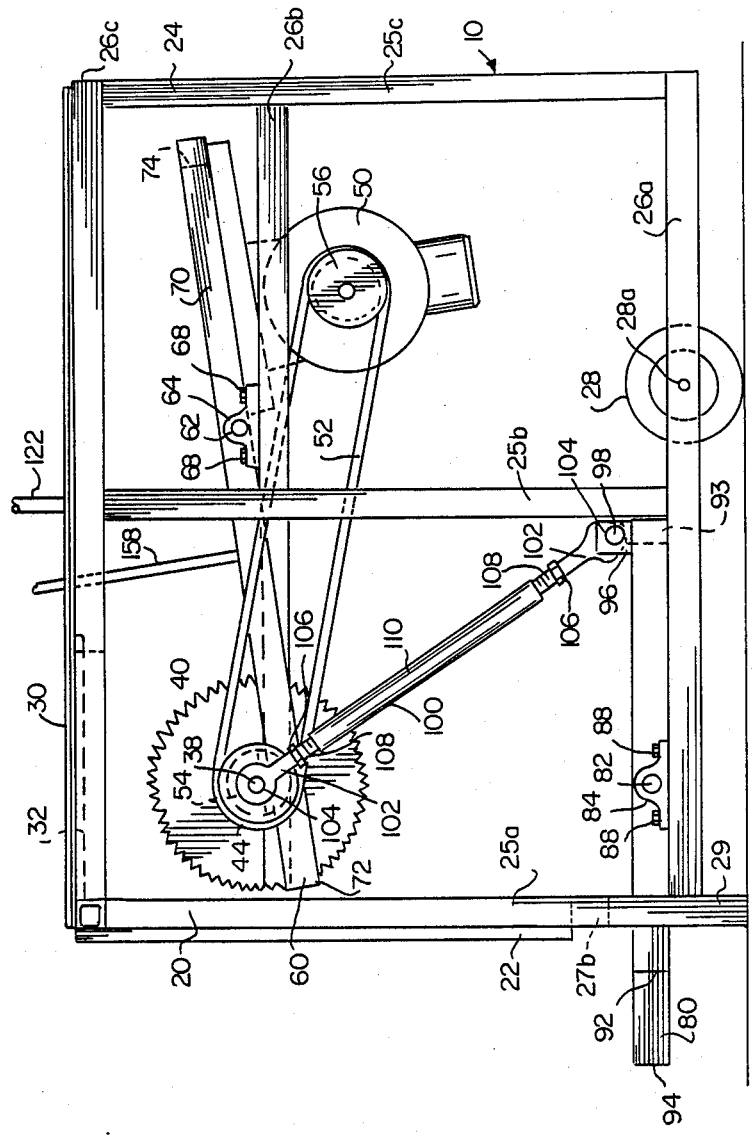
FIG. 3 is a partially broken, sectional right side elevational view of the meat saw of FIGS. 1
Figure 5:
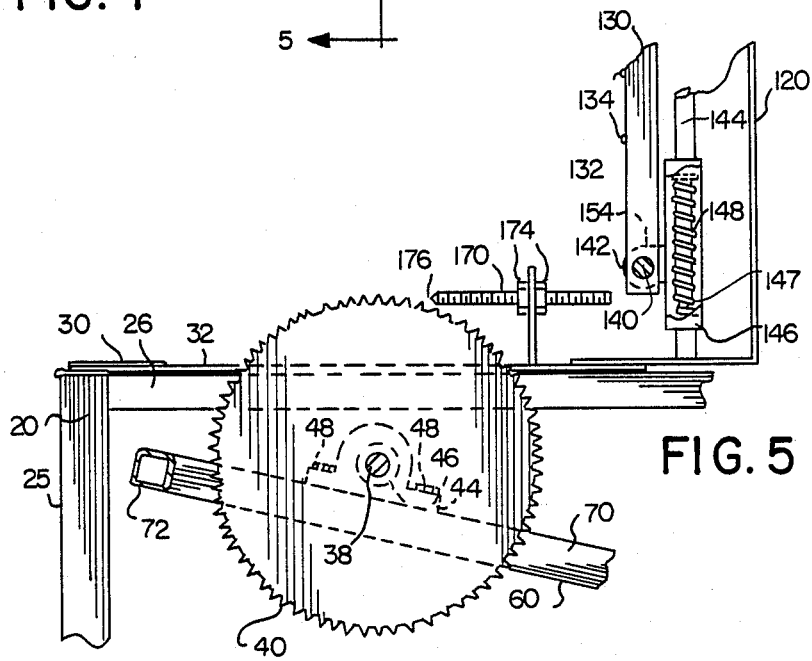
FIG. 5 is a broken sectional view taken generally along the plane of line 5—5 of FIG. 4.

Referring now to FIG. 3, which is a broken sectional view illustrating the interior of the meat saw 10 and to FIGS. 1 and 5, it is seen that the shaft 38 on which the saw blades 40 are mounted is rotatably mounted on a movable frame 60 by a first pair of pillow blocks 44 one such pillow block located proximate each end of the shaft 38. The pillow blocks 44 are of conventional design and include bearings 46 (FIG. 5) which rotatably support the shaft 38. The pillow blocks 44 are secured to the frame 60 by bolts 48.

As best seen in FIG. 1, a plurality of driven pulleys 54 are securely fastened proximate one end of the shaft 38 to drive the shaft 38 as discussed below. The driven pulleys 54 may be rigidly secured to the shaft 38 by any means known in the art such as by set screws, keys and key ways, or the like (not illustrated). An arm member 100 (best seen in FIG. 3) is rotatably secured to the shaft 38 proximate the same end as the pulleys 54 for a purpose described below.

A prime mover, in the present embodiment in the form of an electric motor 50 having a shaft with a corresponding plurality of driving pulleys 56 mounted thereon is also suitably secured to the frame 60. The motor 50 is positioned and oriented on the frame 60 such that the shaft 38 carrying the bades 40 and the motor shaft are generally parallel, and each of the driving pulleys 56 mounted on the motor shaft lies generally in the same plane as a corresponding driven pulley 54 mounted on the shaft 38. A plurality of drive belts 52, preferably V-belts, connect each pair of corresponding driving and driven pulleys 56, 54 so that rotation of the shaft of the motor 50 is transmitted through the driving pulleys 56 and the drive belts 52 to the driven pulleys 54 to rotatingly drive the shaft 38 and the blades 40. While multiple belt drive system as described is presently preferred, a single belt drive or other power transmission means such as a direct drive or chain drive could also be used.

The motor 50 can be of any conventional type; for example, a three phase electric induction motor of the squirrel cage or wound rotor type can be used. A motor control 58 having on and off control buttons 18 is mounted within the base 20 so that the control buttons 18 are accessible to an operator located in front of the meat saw 10 (best seen in FIG. 1).

The frame 60 is generally rectangular in plan view and includes a pair of generally parallel side members 70, as well as a rear member 74 (FIG. 3) and a front member 72 (best seen in FIG. 1). Each of the members of the frame 60 is formed from tubular stock material to provide a frame 60 with high structural strength. An upper pivot shaft 62 extends through suitably sized openings in both sides 70 of the frame member 60 and parallels the shaft 38. The ends of the upper pivot shaft 62 are rotatably mounted to the base 20 by a second pair of pillow blocks 64.

As best seen in FIG. 3, the frame 60 carrying the shaft 38 and saw blades 40 and the motor 50 is pivotably affixed to the base 20 below the saw table 30. The upper pivot shaft 62 defines a pivot axis for the frame 60 which generally parallels the plane of the saw table 30 and the shaft 38. Thus, rotation of the frame 60 about the pivot axis of the upper pivot shaft 62 varies the vertical position of the shaft 38 with respect to the saw table 30. For example, when the frame 60 is rotated clockwise (as viewed in FIG. 3) the shaft 38, as well as the blades 40 approach the saw table 30. Conversely, when the frame 60 is rotated counterclockwise (as viewed in FIG. 3) the shaft 38 and blades 40 draw apart. As best seen in FIG. 1, the blades 40 are positioned on the shaft 38 so that the blades 40 can pass through the apertures 32 in the saw table 30 and protrude above the surface of the saw table 30 when the frame 60 is rotated in the clockwise direction.

As shown in FIG. 3, the motor 50 and the shaft 38 and blades 40 are positioned on the frame 60 on opposite sides of the pivot axis. Preferably, the shaft 38 and the motor 50 are positioned so that the mass on the side of the frame 60 on which the motor 50 is mounted almost counterbalances, but is less than, the mass on the side of the frame 60 on which the blades 40 are mounted. Thus, the blades 40 may be elevated by application of a relatively small force.

The force which elevates the blades 40 is applied through arm member 100 which is pivotably secured on one end to the shaft 38 between the pillow blocks 44 and the driven pulleys 54. The other end of the arm member 100 is similarly pivotably secured to a treadle member or treadle 80 which is adapted to be actuated by an operator of the meat saw 20. The arm member 100 includes a generally tubular sleeve 110 having interior threads at either end thereof. A pair of eye bolts 102 having exterior threads 108 are affixed to either end of the sleeve 110. The external threads 108 on the eye bolts 102 engage the interior threads at either end of the sleeve 110 for adjusting the length or tension of the arm member 100. Nuts 106 are positioned on each of the eye bolts 102 to lock the eye bolts 102 to the sleeve 110. The length of the arm member 100 may be varied by disengaging the arm member 100 from the shaft 38 or treadle 80, loosening one or both of the nuts 106, and threading either or both of the eye bolts 102 into or out of the sleeve 110 as desired.

As indicated above, one eye bolt 102 is rotatably secured on the shaft 38. The other eye bolt 102 is rotatably secured on a pivot pin 98 which in turn is secured by a tab 96 to the treadle 80. As best seen in FIGS. 1 and 3, the treadle 80 includes a generally rectangular frame formed from tubular members, including a front member 92, a pair of generally parallel side members 90, and a rear member 93. In addition, a step member 94 is secured to and extends outwardly from the front member 92 of the treadle member 80 in the plane defined by the frame of the treadle 80. The size of the step member 94 is chosen so that the treadle 80 can be easily actuated by the foot of the operator of the meat saw 10; however, the step member 94 is preferably not so large that there is an increased risk of accidently actuating the treadle 80.

A lower pivot shaft 82 extends through suitably sized openings in the side member: 90 of the treadle 80 and generally parallels the shaft 38 mounting the blades 40. The lower pivot shaft 82 is secured on each end to the base 20 by a third pair of pillow blocks 4 as discussed below. Thus, when the treadle 80 is depressed by an operator of the meat saw 10 the treadle 80 rotates about the lower pivot shaft 82 (counterclockwise as viewed in FIG. 3), thereby elevating the arm member 100 to pivot the frame 60 to raise the shaft 38 and blades 40. When the operator of the meat saw 10 releases the treadle 80 the mass on the side of the frame 60 carrying the shaft 38 is drawn by gravity downward pushing the arm member 100 downwardly, which causes the treadle to rotate in the opposite direction (clockwise as viewed in FIG. 3) so that the step member 34 is elevated to its original position. The shaft 38 bearing the blades 40 correspondingly move downwardly to the original or first position in which they remain until the treadle 80 is again actuated by the operator. In the first position the blades 40 do not extend above the saw table 30 through the apertures 32.

The base 20 is constructed as a frame 24 to which are affixed a set of sheet members or panels (best seen in FIGS. 1 and 2). The panels are preferably hinged to form doors 22 such as the left and right front doors 22a, 22b illustrated in FIGS. 1 and 2. The doors 22 permit easy access to the interior of the base 20 for maintenance including cleaning of the meat saw 10. As best seen in FIG. 3, the frame 24 includes vertical support members including front, middle and rear vertical support members 25a, 25b, 25c, and lower, middle and upper horizontal support members 26a, 26b, 26c affixed to the vertical support members.

The middle horizontal support members 26b and lower horizontal support members 26a respectively provide mounting surfaces for the second and third pairs of pillow blocks 64, 84 in which the upper pivot shaft 62 and lower pivot shaft 82 are respectively mounted. The pillow blocks 64, 84 are secured to the horizontal support members 26b, 26a of the frame 24 by bolts 68, 88 in a conventional manner.

As shown in FIGS. 1 and 2, the frame 24 also includes upper and lower cross support members 27a, 27b extending between the sides of the base 20. The front vertical support members 25a extend below the lower horizontal support members 26a and lower cross support member 27b to form a pair of legs 29 for supporting the front of the base 20. Proximate the rear of the meat saw 10 a pair of wheels 28 are secured by axles 28a to lower horizontal support members 26a. The wheels 28 permit the meat saw 10 to be easily moved for cleaning or maintenance as desired.

A jig or stop member or stop 34 formed from a piece of angle stock is mounted on the saw table 30 proximate one side of the apertures 32 and parallel to the blades 40 by fastener means 36 comprising bolts, nuts and lock washers. The stop 34 provides a convenient means of positioning one end of a piece of meat 200 on the saw table 30 above the apertures 32. In addition to the stop 34 other means are also preferably provided for positioning the piece of meat 20 on the saw table 30.

Figure 4:
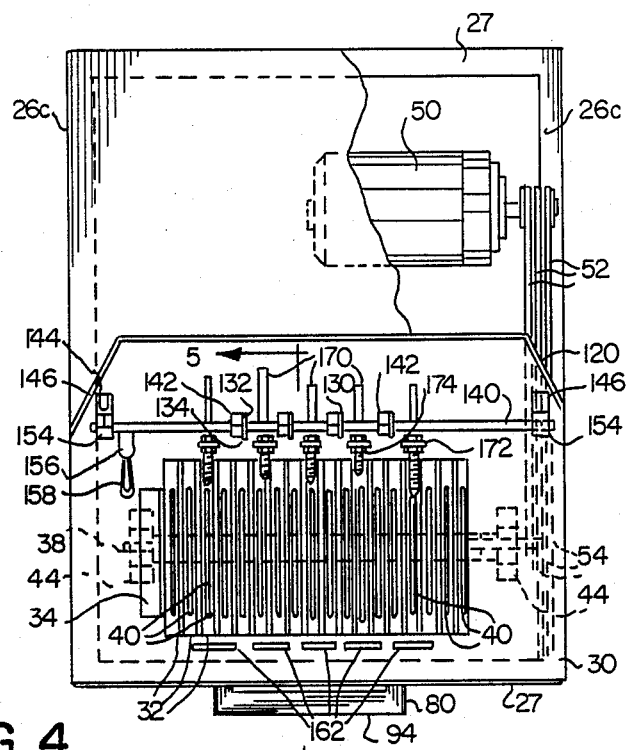
FIG. 4 is a partially broken, sectional plan view of the meat saw of FIG. 1 taken generally along the plane of line 4—4, of FIG. 1.

As best seen in FIGS. 4, 5 and 6, a plurality of meat retention means or rods 170 are provided and positioned generally parallel to saw table 30 and intermediate the blades 40 when the blades 40 are raised above the saw table 30. The rods 170 have exterior threads and are mounted in threaded openings of generally vertically extending supports 172 which are securely affixed to the saw table 30 by welding. The threaded rods 170 have generally pointed ends 176 for engaging and holding the piece of meat 200. The extension of the rods 170 toward the front of the meat saw 10 can be varied. Nuts 174 secure the threaded rods 170 to the supports 172. The position of the rods 170 can be adjusted by loosening the nuts 174 and by threading the rods 170 inwardly or outwardly as desired. The rods 170 can be adjusted to conform to the contour of the piece of meat 200 which is to be sawn. When the piece of meat 200 is engaged and cut by the rotating blades 40, a force is exerted on the piece of reat 200 tending to drive the piece of meat 200 toward the rear of the saw table 30. The component of force paralleling the saw table 30, which is transferred to the piece of meat 200 as the piece of meat is cut by blades 40, is opposed by the rods 170.

As best seen in FIG. 2 and 6, a front safety guard 160 including a plurality of individual guard fingers 162 extends upwardly from the saw table 30 in front of the apertures 32. The front guard 160 reduces the likelihood that the operator will be injured by bone fragments from the piece of meat 200, foreign matter, or other debris propelled by the rotating blades 40. If desired, the front guard 160 may be omitted from the meat saw 10 to provide the operator with a better view of the operation of the meat saw 10 and more convenient access to the portion of the saw table 30 on which the piece of meat 200 is placed.

As best seen in FIGS. 1, 5 and 6, a restraining member 130 is also provided for engaging and holding the piece of meat 200 while it is being cut by the blades 40. The restraining member 130 includes a plurality of elongated, generally parallel, spaced meat engaging members 132. Each of the meat engaging members 132 includes a plurality of spaced teeth 134 positioned on its lower or bottom surface. At one end, each of the meat engaging members 132 is secured to a handle 138 which is adapted to be grasped by the operator. At the other end, each of the meat engaging members 132 is affixed to a generally annular pivot member or pivot 142 having a generally cylindrical hole 143 formed therein. The holes 143 in the pivots 142 of each meat engaging member 132 are aligned on a common axis and a generally cylindrical spindle 140 extends through each of the holes 143. The spindle 140 is mounted proximate each end within generally annular spindle holders 154 by set screws or other suitable means (not shown).

As best seen in FIG. 5, a pair of generally cylindrical support members 144 extend upwardly from the saw table 30 proximate the spindle holders 154. A generally tubular spring case 146 is movably positioned on each of the support members 144. A biasing means or spring 148 is positioned on each of the support members 144 within the spring cases 146 and is affixed proximate the top of the spring 148 to the support member 144. The spring case 146 includes a generally annular inwardly extending lip 147 formed proximate the bottom of the spring case 146. The lip 147 compresses the spring 148 when the spring case 146 is elevated on the support member 144. The spindle holders 154 are secured to the exterior of the spring cases 146 by welding.

The restraining member 130 is pivotably adjustable from a first position (FIG. 1) in which it extends upwardly from the saw table 30 and generally parallel to the support members 144. When a piece of meat 200 is placed on the saw table 30 above the apertures 32, the meat restraining member 130 may be pivoted downwardly by the operator so that the teeth 134 of the meat engaging members 132 contact and engage the piece of meat 200. The meat engaging members 132 are positioned to extend between the fingers 162 of the front guard 160 and the handle 138 is on the front side of the front guard 160 (FIG. 2). Preferably, the spindle 140 on which the restraining member 30 pivots is located closer to the saw table 30 than the top of the piece of meat 200 to be sawn when the restraining member 130 is located in the first position and not in contact with the piece of meat 200. After the piece of meat 200 is initially contacted by the meat restraining member 130, it is preferred that the operator continue to rotate the meat restraining member 130 on the spindle 40 so that meat restraining member 130 additionally pivots on the top surface of the piece of meat 200. The springs 148 within the spring cases 146 are thereby compressed as the springs 148 oppose the motion of the spindle 140 away from the saw table 0. Preferably, the operator continues to rotate the restraining member 130 until the restraining member 130 is generally parallel to the saw table 30.

The restraining member 130 includes a transparent or translucent shield 136 positioned above the meat engaging members 132. The shield 136 is preferably fabricated from a breakage and impact resistant synthetic plastic material such as polymethylmethacrylate or polycarbonate. As best seen in FIG. 1, the transparent shield member 136 is preferably formed from two generally rectangular panels joined on edge. The angle of the joint is selected so that the forward panel is oriented generally perpendicular to the operator's line of sight when the restraining member 130 is holding a piece of meat 200 on the saw table 30. This orientation minimizes the distortion of the operator's view of the cutting operation caused by the shield 136, increasing the accuracy and safety of the cut. The shield 136 also functions to reduce the likelihood of injury to the operator from pieces of bone and the like thrown by the rotating blades 40 and increases the ease with which the meat saw 10 may be cleaned by reducing the scaLLering of meat dust.

A generally ring-shaped collar 150 is movably positioned on each of the support members 144 to limit the upward travel of the spring cases 146. Each collar 150 is adjustably secured to the support member 144 by a bolt 152. The collars 150 can be positioned to limit the downward travel of the restraining member 130 to a position generally parlllel to the saw table 30, speeding the cutting operation.

The restraining member 130 also includes a stop member 156 extending perpendicularly from the spindle 140 proximate one end thereof (best seen in FIG. 4). The stop member 156 is oriented on the spindle 140 so that it extends generally parallel to the saw table 30 when the restraining member 130 is in a raised position extending generally outwardly away from the saw table 30. Thus, when the restraining member 130 is oriented generally parallel to the saw table 30, the stop member 156 extends generally downwardly from the spindle 140 toward the saw table 30. As best seen in FIGS. 3 and 5, affixed to one side 70 of the frame 60 is a generally cylindrical safety rod 158 which extends generally upwardly from the frame 60 and through an elongated opening in the saw table 30. The safety rod 158 is sized and positioned so that it contacts the stop member 156 when the frame 60 is elevated and when the restraining member 130 is positioned extending away from the saw table 30. The contact of the safety rod 158 with the stop member 160 prevents the blades 40 from being substantially elevated through the apertures 32 unless the restraining member 130 is oriented generally parallel to the saw table 30.

During operation the meat saw generates meat "dust" as a by-product. In order to limit the dispersion of the meat dust around the meat saw 10 and to increase the ease of clean up, a hood 120 is provided. The hood 120, best seen in FIGS. 1, 2 and 5, has a cover panel and side and rear panels extending upwardly from the saw table 30 and positioned behind the apertures 32. puting operation of the meat saw 10, meat dust in propelled by rotation of the blades 40 loward thc rear of the saw table 30. This meat dust is interccpted and collected by the hood 120. Also aiding in reducing the scattering of meat dust is a roof 124 affixed to and extending between supports 122.

The meat saw 10 of the present invention is used in making ultiple cuts in a piece of meat 200. The meat to be cut with the saw 10 can be fresh or frozen. However, the meat saw 10 is especially useful in cutting frozen meat. The meat may be beef, lamb, pork or the like. Examples of pieces of meat which the meat saw 10 may be used to cut include shoulder, rack, loin, sirloin, leg, breast and the like.

In making multiple cuts in a piece of meat, the piece of meat 200 is first placed on the meat saw 10 by the operator. Preferably, the piece of meat 200 is at least roughly centered on the portion of the saw table 30 containing the apertues 32. It is preferred that the piece of meat 200 be positioned so that at least a portion of the piece of meat 200 engagcs the pointed ends 176 of the rods 170. The position of the rods 170 is preferably adjusted to generally conform to the general contour of the piece of meat 200 as described above, especially when a number of pieces of meat of the same general type, for example, loin roasts, are to be repetitively cut by the meat saw 10.

If desired, an end of the piece of meat may be placed against the stop 34 which defines a boundary of the cutting surface of the saw table 30. The handle 138 of the restraining member 130 is grasped by the operator and the restraining member 130 is rotated from its upper position down to engage the piece of meat 200. Preferably, the spindle 140 of the restraining member 130 is positioned closer to the saw table 30 than the top of the piece of meat 200 as described above. Thus, when the restraining member 130 first engages the piece of meat 200 it is not yet parallel to the surface of the saw table 30. However, it is preferred that the operator exert additional downward force on the handle 138 so that the restraining member 130 pivots on the piece of meat 200 as described above until the restraining member 130 is approximately parallel to the saw table 30. The additional downward force which the operator exerts on the handle 138 is opposed by the springs 148 so that downward force is exerted on the restraining member both proximate the handle 138 by the operator and proximate the rear of the restraining member 130 by the springs 148. The piece of meat 200 is thus securely engaged with the restraining member 130.

Next, the operator depresses the start button 18 to provide power to the motor 50 for rotation of the blades 40 and depresses the treadle 80 raising the blades 40 through the apertures 32 in the saw table 30 to engage and cut the piece of meat 200. Preferably, the piece of meat 200, which typically contains bone, is positioned on the saw table 30 so that the bone does not project through the top of the piece of meat 200. The blades 40 are then preferably raised to cut the piece of meat 200 until the piece of meat 200 is substantially but not completely cut through by the blades 40. Preferably, the blades 40 are raised until all bone in the planes of the blades 40 is cut substantially through. A piece of meat 210 which has been cut substantially but not completely through by the meat saw 10 is shown in FIG. 6.

After cutting the piece of meat 200 as desired the operator releases the treadle 80 thus lowering the blades 40 to a position beneath the saw table 30, depresses the stop button 18 to remove the power from the motor, and removes the piece of reat 200 from the meat saw 10. Alternatively, the operator may leave the power on for subsequent cuts. Preferably, the piece of meat 200 has not been completely cut through, and the operator removes the piece of meat 200 as a single integral piece which may be easily and quickly removed from the saw table 30.

Although the piece of meat 200 remains a single integral piece, it may subsequently be cut easily by hand. For example, a knife, such as a common kitchen knife, an electric knife, or the like, may be inserted into the kerfs formed by the blades 40 in the piece of meat 200 and the remaining uncut portion of the piece of meat 200 may be severed. Because the uncut portion is preferably relatively thin and contains no bone, portions of the piece of meat 200 may be easily cut while meat 200 is frozen. Thus, the retail distributor, or the restaurant chef, or the consumer of the piece of meat 200 is advantageously provided with the option of either preparing the entire piece of meat 200 as a whole or removing individual portions of the piece of meat 200 while frozen to be prepared as desired.

The meat saw 10 can be employed in the process of the present invention. However, other types of meat saws can also be employed. For example, band saws having multiple blades can be used in the process.

The process includes placing a piece of meat containing bone and tissue adjacent a plurality of generally parallel spaced saw blades. By "tissue" is meant muscle, fat, connective tissues, and all other types of tissue present in an animal carcass, except bone. The saw blades and piece of meat are moved relative to each other to cut into but not cmmpletely through the piece of meat with the saw blades. While in the case of the above-described meat saw 10 the rotary saw blades 40 are adapted to move into the piece of meat 200 which is held between the saw table 30 and the restraining member 130, in the alternative or in addition, the piece of meat 200 can be moved toward the saw blades (not illustrated). The cut of the saw blades is terminated at a point where the bone in the piece of meat has been at least substantially cut through. Preferably, all the bone in the piece of meat is cut through by the saw blades. Nevertheless, sufficient tissue is permitted to remain uncut so that the piece of meat is held together by the uncut tissue as an integral piece. This integral piece may be stored or further processed after the saw blades are withdrawn from the piece of meat.

The saw blades can be initially positioned below the piece of meat and subsequently moved upwardly into the piece of meat as when the meat saw 10 is used in the process. Alternatively, the saw blades can be positioned above the piece of meat initially and subsequently moved downwardly into the piece of meat. The piece of meat can be supported by a support member positioned below the piece of meat and retained by a retension member positioned above the piece of meat as when the meat saw 10 is employed in the process. However, other means of supporting and retaining the piece of meat as it is being sawn can also be used. For example, the piece of meat can be supported by a pair of clamping members contacting the piece of meat at its longitudinal ends during the sawing process (not illustrated).

When the piece of meat is a meat portion such as a rack, roast, shoulder, shank, leg, or the like, which has a generally elongated shape, it is preferred that the longitudinal axis of the piece of meat be oriented perpendicular to the saw blades prior to cutting the piece of meat. When the piece of meat is a meat portion having a generally fell-free surface and another generally fell-covered surface, such as a rib roast or loin roast, it is preferred that the fell-free surface be oriented toward the saw blades when the piece of meat is positioned adjacent to the saw blades. In this case, the uncut tissue which holds together the piece of meat as an integral piece after cutting includes fell. The meat portions which can be processed according to the present invention, include shoulder, neck, leg, rack, loin, sirloin and shank.

The meat saw 10 may be employed as a part of a packing house mass production facility. Pieces of meat 200 may be expeditously delivered to the meat saw 10 by automated means such as by a first conveyer belt. The pieces of meat are removed from the first conveyer belt by the meat saw operator who repetitively cuts each piece of meat 200 delivered and places the cut pieces of meat on a second conveyer belt for subsequent processing. Subsequently, the piece of meat 200 which has been cut may be packaged for shipment and later consumption as by vacuum packaging.

While the illustrated embodiment of the meat saw 10 requires an operator, the meat saw can also be adapted for semi-automatic or automatic operation. For example, means for automatically positioning the piece of meat 200 on the saw table 30, and sensing the position of the piece of meat 200 may be provided. Similarly, means for automatically raising the blades 40 to cut the piece of meat 200 may be employed. Likewise, means may be provided for automatically removing the piece of meat 200 from the saw table 30 after it has been cut by the meat saw 10. The piece of meat 200 may be contaned within a meat holder (not illustrated) which is adapted to contain and hold the piece of meat 200 before, during and after the process of cutting the meat with the meat saw 10. Other aspects of automating the present method and the meat saw 10 will be apparent to those skilled in the art.

From the foregoing description and accompanying drawings it is seen that the present invention provides in one presently preferred embodiment a novel meat saw 10 for simutaneously making multiple cuts in a piece of meat 200, as well as a process employing the meat saw 10 for making multiple cuts in a piece of meat 200. The meat saw 10 permits the operator to easily adjust the depth of cut to the thickness of each individual piece of meat 200 cut. Further, the meat saw 10 can be used to prepare pieces of frozen meat from which individual servings may be severed by the consumer while the piece of meat 200 is still frozen. Further, if the consumer desires to prepare the entire piece of meat 200 at once, the kerfs or notches between each of the individual slices of meat in the piece of meat 200 permit air circulation through the meat which accelerates the defrosting of the piece of meat 200. Thus, the piece of meat 200 may be prepared and served more quickly by the consumer than a piece of meat 200 which has not been processed according to the present invention. Similarly, the process of the present invention provides kerfs or slots for air circulation which hastens the freezing of a piece of meat 200 which has been cut fresh with the meat saw 10, thus providing the packing house operator with an additional economy of operation.

It will be recognized by those skilled in the art that changes may be made to the above-described embodiment of the invention without departing from the broad inventive concept thereof. It is understood, therefore, that this invention is not limited to the particular embodiment disclosed, but is intended to cover all modifications which is within the scope and spirit of the invention which are defined by the appended claims.

I claim:

1. A meat saw for simutaneously making mutiple cuts in a piece of meat comprising:
   a base mamber;
   a saw table supported by the base member and adpated to support the piece of meat to be sawn, the saw table containing a plurality of elongated, generally parallel apertures;
   means for holding the piece of meat against the saw table, the means for holding the piece of meat comprising a restraining member for engaging and holding the piece of meat while it is being cut by the saw blades and means for pivotally mounting the restraining member on the saw table, the restraining member being pivotally adjustable from an upper position in which the restraining member extends away from the saw table to a lower position in which the restraining member extends generally parallel to the saw table proximate the apertures;
   a plurality of spaced rotary saw blades mounted on a common rotatable shaft, the shaft being located beneath the saw table and movably mounted on the base member so that the position of the shaft relative to the saw table is continuously adjustable from a lower position in which the blades do not extend above the saw table to an upper position in which the blades extend through the apertures in the saw table and above the saw table to engage and cut the meat when the shaft is raised toward the upper position;
   means for rotatingly driving the shaft; and
   means for adjusting the position of the shaft relative to the saw table.

2. A meat saw according to claim 1 additionally comprising a rigid frame member pivotally affixed to the base member below the saw table and having a pivot axis paralleling the saw table, the shaft being mounted on the frame member so that rotation of the frame member about the pivot axis varies the vertical position of the shaft with respect to the saw table.

3. A meat saw according to claim 2 wherein the means for driving the saw blades include a prime mover, the shaft and the prime mover being positioned on the frame member on opposite sides of the pivot axis so that the mass on the side of the frame on which the prime mover is mounted almost counterbalances the mass on the side of the frame on which the saw blades are mounted whereby the saw baldes may be elevated from the first position by application of a relatively small force.

4. A meat saw according to claim 3 additionally comprising an arm member and a treadle member pivotably affixed to the base below the saw table, the treadle member being adapted to be actuated by an operator of the meat saw, the arm member interconnecting the treadle member and the frame member so that actuation of the treadle member results in the pivoting of the frame member and the saw blades are elevated.

5. A meat saw according to claim 1 further including generally hour glass-shaped spacer members for generally equally spacing the saw baldes, each spacer member having an axially extending aperture adapted to receive the shaft, generally flat ends adapted to engage the blades, and a surface extending between the ends, the intersection of the surface with a plane extending through the axis of the spacer being a curve making acute angles with the lines formed by the intersection of the ends and the plane, whereby cleaning of the space between the saw blades separated by a spacer member is facilitated.

6. A meat saw according to claim 1 wherein the restraining member includes a plurality of generally parallel meat engaging members adapted to extend between the saw blades when the blades are raised above the saw table and the restraining member is positioned proximate the saw table.

7. A meat saw according to claim 6 wherein the restraining member additionally comprises a transparent shield member mounted over the meat engaging members.

8. A meat saw according to claim 1 wherein the restraining member is adapted to pivot on the piece of meat when the piece of meat is engaged by the restraining member.

9. A meat saw according to claim 8 wherein the means for pivotably mounting the restraining member comprises at least one bearing means and biasing means for biasing the bearing means toward the saw table, the bearing means being located closer to the saw table than the top of the piece of meat to be aawn when the restraining member extends away from the saw table; whereby when the restraining member is pivoted toward the saw table and engages the piece of meat, the restraining member pivots on the piece of meat, the biasing means opposing the motion of the bearing means away from the saw table.

10. A meat saw according to claim 9 wherein the biasing means and bearing means are adapted to permit the restraining member to pivot on the piece of meat at least until the restraining member is generally parallel to the saw table.

11. A meat saw according to claim 1 wherein the restraining member is adapted to be pivoted by an operator of the meat saw.

12. A meat saw according to claim 1 additionally comprising safety interlock means adapted to prevent the saw blades from being raised when the means for holding the piece of meat has not been positioned to hold the piece of meat against the saw table.

13. A meat saw according to claim 1 additionally comprising meat retention means positioned generally parallel to the saw table and intermediate the blades when the blades are raised above the saw table, the meat retention means engaging the piece of meat and opposing the component of force paralleling the saw table which is transferred to the piece of meat as the piece of meat is cut by the blades.

14. A meat saw according to claim 13 wherein the meat retention means comprises a plurality of rod members, the rod members being adjustable to conform the meat retention means to the shape of the piece of meat.

15. A process for cutting a piece of meat containing bone and tissue comprising:
   placing the piece of meat adjacent a plurality of generally parallel spaced saw blades;
   moving the saw blades and the piece of meat relative to each other to cut into but not completely through the piece of meat with the saw blades;
   terminating the cut of the saw blades at a point where the bone has been at least substantially cut through but sufficient tissue remains uncut so that the piece of meat is held together by the uncut tissue as an integral piece; and
   withdrawing the saw blades from the piece of meat.

16. A process according to claim 15 wherein the piece of meat is frozen.

17. A process according to claim 15 wherein the saw blades are rotary blades.

18. A process according to claim 15 wherein the tissue is cut substantially through.

19. A process according to claim 15 wherein the bone is cut completely through.

20. A process according to claim 17 wherein the saw blades are moved into the piece of meat.

21. A process according to claim 20 wherein the saw blades are initially positioned below the piece of meat and are moved upwardly into the piece of meat.

22. A process according to claim 21 wherein the piece of meat is supported by a support member positioned below the piece of meat and retained by a retention member positioned above the piece of meat.

23. A process according to claim 12 wherein the piece of meat is a meat portion selected from the group consisting of shoulder, neck, leg, rack, loin, sirloin and shank.

24. A meat saw for simutaneously making multiple cuts in a piece of meat comprising:
   a base member;
   a saw table supported by the base member and adapted to support the piece of meat to be sawn, the table comprising a plurality of elongated, generally parallel apertures;
   a plurality of spaced rotary saw blades mounted on a common rotatable shaft, the shaft being located beneath the saw table and movably mounted on the base member so that the position of the shaft relative to the saw table is continuously adjustable from a lower position in which the blades do not extend through the apertures in the saw table to an upper position in which the blades extend through the apertures in the saw table and above the saw table to engage and cut the meat when the shaft is raised toward the upper position;
   a restraining member for engaging and holding the piece of meat while it is being cut by the saw blades comprising a plurality of generally parallel meat engaging members, the restraining member being pivotably adjustable from an upper position in which the restraining member extends away from the saw table to a lower position in which the restraining member extends generally parallel to the saw table proximate the apertures and adapted to extend between the saw blades when the blades are raised above the saw table and the restraining member is positioned approximate the saw table;
   a prime mover for rotating the shaft, the shaft and prime mover being positioned on a rigid frame member pivotably affixed to the base member below the saw table and having a pivot axis paralleling the saw table, the shaft being mounted on the frame member so that the rotation of the frame member about the pivot axis varies the vertical position of the shaft with respect to the saw table, the shaft and prime mover being positioned on the frame member on opposite sides of the pivot axis so that the mass on the side of the frame on which the prime mover is mounted almost counterbalances the mass on the side of the frame on which the saw blades are mounted whereby the saw blades may be elevated from the first position by application of a relatively small force; and
   means for adjusting the position of the shaft relative to the saw table comprising an arm member and treadle member pivotably affixed to the base below the saw table, the treadle member being adapted to be actuated by an operator of the meat saw, the arm member interconnecting the treadle member and frame member so that actuation of the treadle member results in the pivoting of the frame member and elevation of the saw blades.

25. A meat saw according to claim 24 wherein the restraining member includes means for pivotably mounting thereof, the restraining member being adapted to pivot on the piece of meat when the meat is engaged by the restraining member and when the restraining member is generally parallel to the saw table;
   the means for pivotably mounting the restraining member comprising at least one bearing and biasing means for biasing the bearing means toward the saw table, the bearing means being located closer to the saw table than the top of the piece of meat to be sawn when the restraining member extends away from the saw table;
   whereby when the restraining member is pivoted toward the saw table and engages the piece of meat, the restraining member pivots on the piece of meat, the biasing means opposing the motion of the bearing means away from the table.

26. A meat saw according to claim 24 additionally comprising a plurality of od members to form meat retention means, the rod members being adjustable to conform the meat retention means to the shape of the piece of meat and positioned generally parallel to the saw table and intermediate the blades when the blades are raised above the saw table, the meat retention means engaging the piece of meat and opposing the component of force parallelling the saw table which is transferred to the piece of meat as the piece of meat is cut by the blades.

27. A meat saw according to claim 24 additionally comprising safety interlock means adapted to prevent the saw blades from being raised when the means for holding the piece of meat has not been positioned to hold the piece of meat against the saw table.

* * * * *